United States Patent
Jeong et al.

(10) Patent No.: US 9,333,594 B2
(45) Date of Patent: May 10, 2016

(54) LEAD-FREE SOLDER COMPOSITION FOR GLASS

(71) Applicants: Hyundai Motor Company, Seoul (KR); Kia Motors Corporation, Seoul (KR); Korea Autoglass Corporation, Yeongi, Chungcheongnam-Do (KR); Heesung Material Ltd., Yongin, Gyeonggi-Do (KR)

(72) Inventors: Hae Won Jeong, Gyeonggi-do (KR); Hyun Dal Park, Gyeonggi-do (KR); Tae Seung Lee, Gyeonggi-do (KR); Seung Kyu Kim, Gyeonggi-do (KR); Hong Nho Joo, Chungcheongnam-do (KR); Ho June Yoon, Chungcheongnam-do (KR); Min Ho Bak, Ulsan (KR); Joo Dong Lee, Gyeonggi-do (KR); Hyun Chae Jung, Gyeonggi-do (KR); Sun Myung Lee, Gyeonggi-do (KR)

(73) Assignees: Hyundai Motor Company, Seoul (KR); Kia Motors Corporation, Seoul (KR); Korea Autoglass Corporation, Yeongi, Chungcheongnam-do (KR); Heesung Material Ltd., Yongin, Gyeonggi-do (KR)

( * ) Notice: Subject to any disclaimer, the term of this patent is extended or adjusted under 35 U.S.C. 154(b) by 130 days.

(21) Appl. No.: 13/712,326

(22) Filed: Dec. 12, 2012

(65) Prior Publication Data

US 2014/0044589 A1    Feb. 13, 2014

(30) Foreign Application Priority Data

Aug. 13, 2012    (KR) .................... 10-2012-0088178

(51) Int. Cl.
*B23K 35/14*    (2006.01)
*B23K 35/24*    (2006.01)
*B23K 35/02*    (2006.01)
*B23K 35/26*    (2006.01)

(52) U.S. Cl.
CPC ............. *B23K 35/24* (2013.01); *B23K 35/025* (2013.01); *B23K 35/0244* (2013.01); *B23K 35/0261* (2013.01); *B23K 35/262* (2013.01)

(58) Field of Classification Search
CPC ............ H01L 2924/01029; H01L 2924/0103; H01L 2924/01049; H01L 2924/014; H05K 3/3463; B23K 35/0244; B23K 35/025; B23K 35/262
USPC ................... 228/557, 56.3; 420/557
See application file for complete search history.

(56) References Cited

U.S. PATENT DOCUMENTS

| | | |
|---|---|---|
| 5,242,658 A | 9/1993 | Stevens et al. |
| 5,538,686 A | 7/1996 | Chen et al. |
| 6,241,942 B1 | 6/2001 | Murata et al. |
| 2006/0067852 A1 | 3/2006 | Suh et al. |
| 2007/0034305 A1 | 2/2007 | Suh |
| 2007/0152026 A1 | 7/2007 | Suh et al. |

FOREIGN PATENT DOCUMENTS

| | | |
|---|---|---|
| BG | 51243 A3 | 3/1993 |
| CN | 1764515 A | 4/2006 |
| CN | 101132881 A | 2/2008 |
| CN | 101700605 A | 5/2010 |
| JP | 07227690 | 8/1995 |
| JP | 08019892 A | 1/1996 |
| JP | 08243782 A | 9/1996 |
| KR | 20080025762 A | 3/2008 |
| SU | 520413 A1 | 7/1976 |
| WO | 2004/089573 A1 | 10/2004 |

*Primary Examiner* — Erin Saad
(74) *Attorney, Agent, or Firm* — Mintz Levin Cohn Ferris Glovsky and Popeo, P.C.; Peter F. Corless

(57) ABSTRACT

The present invention provides a lead-free solder composition for glass. The lead-free solder composition for glass includes indium, zinc, and tin. The indium (In) ranges from about 30.0 wt % to about 60 wt %. The zinc (Zn) ranges from about 0.01 wt % to about 11.0 wt %. The tin (Sn) is included as a remaining component.

7 Claims, No Drawings

LEAD-FREE SOLDER COMPOSITION FOR GLASS

CROSS-REFERENCE TO RELATED APPLICATION

This application claims under 35 U.S.C. §119(a) the benefit of Korean Patent Application No. 10-2012-0088178, filed Aug. 13, 2012, the entire contents of which are incorporated herein by reference.

BACKGROUND (a) Technical Field

The present invention relates to a lead-free solder composition for glass. More particularly, it relates to an eco-friendly lead-free solder composition for glass that lacks heavy metals such as lead, while preventing glass cracking during vehicle operation.

(b) Background Art

Generally, glass is used on all sides of a vehicle to ensure a driver's view of the road and surrounding environment. In particular, the glass used in the front (e.g., windshield) and the back (e.g., rear window) of the vehicle is typically subject to additional vehicle functionality such as, for example, a defroster, radio antenna, etc. associated with the windshield and a heating element, antenna, etc. associated with the rear window.

In order to provide these types of functionalities to vehicle's windows, it is necessary to provide electrical connections for power supply and electrical signal transmission. In order to stably supply electricity to a vehicle's glass window, a terminal for supplying power from the battery to an electrode formed on/in the glass surface must be soldered. Unfortunately, the terminal and the glass are formed of different materials that have significantly different thermal expansion coefficients. Under vehicle operating temperatures that may range from about −40° C. to about +105° C., the difference in the thermal expansion rates of these materials may result in the glass cracking.

Accordingly, lead (Pb), which is a soft metal, is typically added to a solder for glass in order to disperse the thermal stress that occurs between the glass and the terminal. For example, in the case of windshield glass, heating element wires are disposed in the lower part of glass to prevent the wiper blades from freezing in winter. In the case of side window glass, an antenna may be disposed on the side window glass of vehicles such as panel vans. Similarly, in the case of rear window glass, heat wires, antenna, etc. may disposed.

The heating element wire and the antenna are usually formed by printing a paste including silver (Ag) as a main ingredient, and sintering the paste in glass. The heating element wire and the antenna are soldered with terminals for an electric connection. At present, a leaded solder, i.e., a solder including a large quantity of lead (Pb), such as tin (Sn)-62 lead (Pb)-3 silver (Ag)-10 bismuth (Bi) composition is conventionally used.

Recently, SOx and NOx are being emitted in great quantities into the atmosphere due to increase of the use of fossil fuels such as gasoline or heavy oil. These airborne pollutants have the effect of lowering the pH of rain, causing acid rain. Unfortunately, when acid rain comes into contact with the soldered parts of electronic equipments on the ground, it can cause the lead to melt out of a lead-tin alloy solder and penetrate into the ground, thereby contaminating the groundwater with heavy metals (e.g., Pb). Such heavy metal contamination may lead to a variety of health conditions in people who consume the contaminated water, such as lead poisoning. Accordingly, a lead-free solder is needed.

In the case of lead-free solder, a three (Sn—Ag—Cu) element-based solder such as tin (Sn)-3.0 silver (Ag)-0.5 copper (Cu) composition is generally used. Unfortunately, this composition has a limitation in glass-metal applications because cracks occur in the glass as a result of a stress generated when the lead-free solder melted at a high temperature is hardened in a glass substrate during the soldering process. This is caused by a difference of the expansion coefficient between glass and an alloy including tin (Sn) and other metals.

Also, U.S. Pat. No. 6,253,988 discloses a 4-element-based lead-free solder composition of tin (Sn)-silver (Ag)-copper (Cu)-indium (In) composition for use in vehicle glass applications, which provides a composition of tin (Sn)-4.5 silver (Ag)-0.5 copper (Cu)-65 indium (In). Unfortunately, this composition is of limited commercial value because contains significant levels of indium (In) and silver (Ag), and is therefore cost prohibitive.

SUMMARY OF THE DISCLOSURE

The present invention provides a lead-free solder composition for glass, which provides a number of advantages including: reduced/eliminated toxicity, optimized wettability while preventing glass cracking of the soldered terminal part, and increased bonding strength.

In one aspect, the present invention provides a lead-free solder composition for glass, comprising: indium (In) of about 30.0 wt % to about 60 wt %; zinc (Zn) of about 0.01 wt % to about 11.0 wt %; and tin (Sn) as the remaining component. In an exemplary embodiment, the composition may further include one or more elements selected from the group consisting of copper (Cu), manganese (Mn), and nickel (Ni). In another exemplary embodiment, the composition may further include copper (Cu) of about 0.1 wt % to about 3.0 wt %. In still another exemplary embodiment, the composition may further include manganese (Mn) of about 0.01 wt % to 0.5 wt %. In yet another exemplary embodiment, the composition may further include nickel (Ni) of about 0.01 wt % to about 0.5 wt %.

In still yet another exemplary embodiment, the composition may be prepared for use in manufacturing one or more solder pre-forms selected from the group consisting of solder paste, solder ball, solder bar, solder wire, solder bump, solder plate, solder powder, solder pellet, solder particle, solder ribbon, solder washer, and solder ring.

Other aspects and exemplary embodiments of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention relates to a lead-free solder composition for glass, which is an eco-friendly, non-toxic solder composition comprising a 3-element-based solder of tin (Sn)-indium (In)-zinc (Zn) that optimizes the junction glass cracking characteristics, the melting point, and the adhesive strength of the solder.

The lead-free solder composition of the present invention is formed in consideration of the wettability and the workability characteristics of the solder with respect to a glass substrate, and the reliability of the solder against mechanical impact, which are the same as, or better than, a conventional leaded solder. Specifically, the present invention may provide a 3-element (tin (Sn)-indium (In)-zinc (Zn))-based lead-free solder composition for glass, which may include about 30.0 wt % to about 60.0 wt % indium (In), about 0.01 wt % to 11.0 wt % zinc(Zn), and tin (Sn) as a remaining component.

In the lead-free solder composition, tin (Sn) is a significant component of the lead-free solder alloy, which is not toxic and can be easily alloyed with other metals, and increases wettability with respect to a base material for bonding.

Also in the lead-free solder composition, about 30.0 wt % to about 60.0 wt % indium (In) may be included. When indium (In) is added at a level less than about 30.0 wt %, the softness of the solder may be reduced so as to cause cracking of the glass during soldering on the glass plate. When indium (In) is added at a level greater than about 60.0 wt %, the softness and the mechanical characteristics of the solder may not be improved in proportion to the content of indium (In), and the price of the solder alloy may be increased rapidly. Accordingly, the content of the indium (In) may range from about 30.0 wt % to about 60 wt %, and more preferably, may be about 42 wt %.

In the lead-free solder composition, since the content of zinc (Zn) may range from about 0.01 wt % to about 11.0 wt %, Zn may serve to inhibit silver precipitation by forming a bonding interface between the solder and the base material by its affinity to the base material, e.g., silver (Ag) that is used as the material of a terminal. When zinc (Zn) is added at an amount less than about 0.01 wt %, silver precipitation may occur due to reduction of formation of the bonding interface between zinc (Zn) and the base material. When zinc (Zn) is added at an amount more than about 11 wt %, regardless of the process composition, the bond strength and the mechanical properties may not be improved in proportion to the content of zinc (Zn), and the workability may be significantly reduced due to the oxidation of zinc (Zn). Accordingly, the content of zinc (Zn) may range from about 0.01 wt % to about 11.0 wt %, and more preferably, may be about 4 wt %.

The lead-free solder composition may additionally include one or more elements selected from the group consisting of copper (Cu), manganese (Mn), and nickel (Ni). Specifically, the lead-free solder composition may additionally include about 0.1 to about 3.0 wt % Cu, about 0.01 wt % to about 0.5 wt % Mn, and about 0.01 wt % to about 0.5 wt % Ni.

Since about 0.1 to 3.0 wt % copper (Cu) is included in the lead-free solder composition, a physical deformation under a high temperature environment may be minimized. When Cu is included at an amount less than about 0.1 wt %, the effect may be slight. On the other hand, when Cu is included at an amount above about 3.0 wt %, an excessive compound formation between Cu and Zn metals may affect the workability of the resulting solder.

Since about 0.01 to 0.5 wt % Mn is included in the lead-free solder composition, the melting point of the alloy may increase. When Mn is included at an amount less than about 0.01 wt %, an effect of increasing the melting point of the alloy may be slight. On the other hand, when Mn is included at an amount above about 0.5 wt %, the workability may be reduced by the oxidation of Mn.

Since about 0.01 to about 0.5 wt % Ni is included in the lead-free solder composition, the structure of the bonding interface may be densified, and thus the bonding strength may increase. When Ni is included at an amount less than about 0.01 wt % Ni, the increased effect of the bonding strength may be slight. On the other hand, when Ni is included at an amount above about 0.5 wt %, the mush zone may be widened, reducing the workability of the solder.

The lead-free solder composition of the present invention may be prepared for use in manufacturing as one or more solder pre-forms selected the group consisting of solder paste, solder ball, solder bar, solder wire, solder bump, solder plate, solder powder, solder pellet, solder particle, solder ribbon, solder washer, and solder ring.

The most ideal lead-free solder composition is a 3-element-based composition of tin (Sn)-42 indium (In)-4 zinc (Zn). Lead-free solder compositions according to exemplary embodiments of the present inventions, a typical leaded solder composition (Sn-3 Ag-62 Pb-10 Bi), and a typical 4-element-based lead-free solder composition (Sn-2.5 Ag-2.0 Cu-0.8 In) will be evaluated through the same experiments after manufacturing according to the following embodiments and comparative examples.

EXAMPLES

Alloys according to examples 1 to 8 were manufactured to have the compositions as shown Table 1.

COMPARATIVE EXAMPLES

Alloys according to the comparative examples 1 to 3 were manufactured to have the compositions shown Table 1. The alloy according to comparative example 1 has the same composition as a typical 3-element-based lead-free solder, and the alloy according to comparative example 2 has the same composition as a typical 4-element-based lead-free solder. Also, the alloy according to comparative example 3 has the same composition as typical leaded solder.

TABLE 1

| Division | Added chemical quantity (wt %) | | | | | | | | |
|---|---|---|---|---|---|---|---|---|---|
| | Sn | In | Zn | Ni | Ag | Cu | Pb | Bi | Mn |
| Example 1 | rest | 40 | 2 | | | | | | |
| Example 2 | rest | 40 | 4 | | | | | | |
| Example 3 | rest | 40 | 6 | | | | | | |
| Example 4 | rest | 40 | 8 | | | | | | |
| Example 5 | rest | 30 | 4 | | | | | | 0.03 |
| Example 6 | rest | 40 | 4 | 0.1 | | 1.0 | | | |
| Example 7 | rest | 50 | 4 | | | | | | |
| Example 8 | rest | 60 | 4 | | | | | | |
| Comparative Example 1 | rest | | | | 3 | 0.5 | | | |
| Comparative Example 2 | rest | 65 | | | 4.5 | 0.5 | | | |
| Comparative Example 3 | rest | | | | 3 | | 62 | 10 | |

TEST EXAMPLE

Alloys according to examples 1 to 8 and comparative example 1 to 4 were tested to determine whether they can be applied to glass for a vehicle, and the results are shown in Tables 2 and 3 below.

In Table 2, 'NG' indicates that a crack occurred on the glass substrate, and "OK" indicates that a crack did not occur on the glass substrate.

TABLE 2

| division | Solidus Temperature (° C.) | Liquidus Temperature (° C.) | Glass substrate crack | Heat Cycle | | | |
|---|---|---|---|---|---|---|---|
| | | | | 1 | 2 | 3 | 4 |
| Example 1 | 106 | 111 | OK | OK | OK | OK | OK |
| Example 2 | 106 | 110 | OK | OK | OK | OK | OK |
| Example 3 | 106 | 110 | OK | OK | OK | OK | OK |
| Example 4 | 106 | 110 | OK | OK | OK | OK | OK |
| Example 5 | 106 | 112 | OK | OK | OK | OK | OK |
| Example 6 | 111 | 120 | OK | OK | OK | OK | OK |
| Example 7 | 107 | 110 | OK | OK | OK | OK | OK |
| Example 8 | 107 | 110 | OK | OK | OK | OK | OK |
| Comparative Example 1 | 217 | 221 | NG | NG | NG | NG | NG |
| Comparative Example 2 | 118 | 121 | OK | OK | OK | OK | OK |
| Comparative Example 3 | 160 | 233 | OK | NG | OK | OK | OK |

1) Comparison of Crack Occurrence

Alloys according to the examples 1 to 8 and according to the comparative examples 1 to 3 were soldered on a glass substrate with an iron heated to a temperature of about 300° C., and then the solders were slowly hardened at a room temperature of about 20° C. Thereafter, the samples were checked with the naked eye to determine whether or not a crack occurred.

As shown in Table 2, while a crack did not occur in the solder alloyed according to the examples 1 to 8, a crack occurred in the solder alloyed according to the comparative example 1. Accordingly, it was verified that the solder according to examples 1 to 8 is better than the solder according to the comparative example 1 with respect to glass cracking characteristics.

2) Comparison of Heat Cycle

The solders alloyed according to the examples 1 to 8 and the comparative examples 1 to 3 were heated four times and cooled within a temperature range from about −40° C. to about 90° C. at a rate of about 1° C. per minute, and then they were checked with the naked eye every cycle to determine whether or not a crack occurred in the glass substrate.

As shown in Table 2, while a crack did not occur in the solder alloyed according to the examples 1 to 8, a crack occurred in the solder alloyed according to the comparative example 1 during every cycle, and a crack occurred just one time in the solder alloyed according to the comparative example 3. Accordingly, it was verified that the solders according to examples 1 to 8 were better than the solders according to the comparative examples 1 to 3.

3) Comparison of Melting Start Temperature

A glass substrate including the solders alloyed according to the examples 1 to 8 and according to the comparative examples 1 to 3 by an iron heated to about 300° C. was put into a heater, and heated to measure the solidus temperature and the liquidus temperature of each solder. Thus, the melting start temperatures of the solders were measured.

As shown in Table 2, while the solidus temperature and the liquidus temperature of the solders according to the examples 1 to 8 were measured to be about 110° C., the solidus temperature and the liquidus temperature of the solders according to the comparative examples 1 to 3 were measured to be a temperature higher than about 110° C., particularly, a high temperature of about 200° C. Accordingly, it could be verified that the solders according to the examples 1 to 8 have melting points lower than those of the solder according to comparative examples 1 to 3.

TABLE 3

| | Bonding strength (kgf) | | | |
|---|---|---|---|---|
| Division | Before heat impact | After heat impact | Modulus of rupture | Click number |
| Example 1 | 28.8 | 27.0 | 91.9 | 1922 |
| Example 2 | 30.8 | 28.1 | 92.5 | 1945 |
| Example 3 | 31.6 | 29.2 | 99.4 | 2197 |

TABLE 3-continued

| Division | Bonding strength (kgf) | | Modulus of rupture | Click number |
|---|---|---|---|---|
| | Before heat impact | After heat impact | | |
| Example 4 | 32.1 | 31.5 | 100.3 | 2446 |
| Example 5 | 37.3 | 35.5 | 101.5 | 2366 |
| Example 6 | 43.2 | 40.3 | 103.1 | 2400 |
| Example 7 | 32.5 | 30.1 | 102.2 | 2143 |
| Example 8 | 28.4 | 27.6 | 107.1 | 2241 |
| Comparative Example 1 | 21.0 | Glass crack | 80.1 | 1432 |
| Comparative Example 2 | 26.9 | 24.7 | 83 | 1840 |
| Comparative Example 3 | 40.2 | 41.1 | 93.8 | 1630 |

4) Comparison of Bonding Strength of Solders

Alloys according to the examples 1 to 8 and the comparative examples 1 to 3 were soldered on a glass substrate with an iron heated to a temperature of about 300° C. and then the solders were placed at room temperature for about 48 hours. Thereafter, the bonding strengths before and after heat impact were measured with a tensile strength meter.

As shown in Table 3, the bonding strengths of the solders manufactured with alloys according to examples 1 to 8 were measured to be more than a reference value of 15 kgf. On the other hand, in a solder manufactured with an alloy according to the comparative example 1, a crack was observed. Also, it can be observed that the solder manufactured with an alloy according to the comparative example 3 is better than the solder manufactured with an alloy according to the comparative example 2 in the bond strength characteristic.

5) Comparison of Hardness of Solder against Mechanical Impact

The solders manufactured with alloys according to the examples 1 to 8 and the comparative examples 1 to 3 were soldered on a glass substrate with an iron heated to a temperature of about 300° C., and then the solders were placed at room temperature for about 48 hours. Thereafter, an evaluation of the modulus of rupture was performed by fixing both ends of the glass substrate and measuring the strength when the glass substrate is broken by a force applied to the soldering part. Also, a click number test was performed by counting the number of strokes when the glass substrate is broken due to a fatigue caused by applying a certain force by a rubber hammer to the opposite side to the soldering part of the glass substrate.

As shown in Tables 2 and 3, compared to the solders according to the comparative examples 1 to 3, the solders formed of tin-indium-zinc according to the examples 1 to 8 have improved reliability in terms of the heat cycling and glass cracking characteristics, improved bonding strength, improved mechanical impact reliability, and lower melting points. Thus, it is apparent that the solders according to the examples 1 to 8 are equivalent to, or better than, those of the comparative examples 1 to 3.

A lead-free solder composition for glass according to an exemplary embodiment of the present invention performs at a level equal to, or greater than, a typical leaded-solder and a 3-element-based lead-free solder, and also reduces manufacturing cost by reducing the indium use and not using silver as compared with 4-element-based lead-free solder.

Thus, the lead-free solder composition for glass possess the solder characteristics required for use in vehicle glass applications, while maintaining eco-friendly characteristics that will comply with environmental regulations pertaining to heavy metals.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A composition, consisting of:
    indium (In) in an amount from about 30.0 wt % to about 60.0 wt %;
    zinc (Zn) in an amount from about 0.01 wt % to 11.0 wt %;
    at least two elements selected from the group consisting of: copper (Cu) in an amount from about 0.1 wt % to about 3.0 wt %, manganese (Mn) in an amount from about 0.01 wt % to about 0.5 wt % and nickel (Ni) in an amount from about 0.01 wt % to about 0.5 wt %; and
    tin (Sn) as the remaining component.

2. The composition of claim 1, wherein the composition is prepared for use in manufacturing a solder pre-form selected from the group consisting of a solder paste, a solder ball, a solder bar, a solder wire, a solder bump, a solder plate, a solder powder, a solder pellet, a solder particle, a solder ribbon, a solder washer, and a solder ring.

3. The composition of claim 1, wherein the amount of In is 30.0 wt %.

4. The composition of claim 1, wherein the amount of In is 60 wt %.

5. The composition of claim 1, wherein the amount of Zn is 11.0 wt %.

6. A composition, consisting of: 30.0 wt % indium (In); 0.01 wt % zinc (Zn); at least two elements selected from the group consisting of: copper (Cu), wherein the amount of Cu ranges from about 0.1 wt % to about 3.0 wt %, manganese (Mn) wherein the amount of Mn ranges from about 0.01 wt % to about 0.5 wt %, and nickel (Ni), wherein the amount of Ni ranges from about 0.01 wt % to about 0.5 wt %; and remainder tin (Sn).

7. The composition of claim 6, wherein the composition is prepared for use in manufacturing a solder pre-form selected from the group consisting of a solder paste, a solder ball, a solder bar, a solder wire, a solder bump, a solder plate, a solder powder, a solder pellet, a solder particle, a solder ribbon, a solder washer, and a solder ring.

* * * * *